(12) United States Patent
McLaughlin et al.

(10) Patent No.: US 9,193,316 B2
(45) Date of Patent: Nov. 24, 2015

(54) BATTERY ENCLOSURE SYSTEMS AND METHODS

(71) Applicant: GM GLOBAL TECHNOLOGY OPERATIONS LLC, Detroit, MI (US)

(72) Inventors: Barton W. McLaughlin, Troy, MI (US); Andrew P. Oury, Troy, MI (US); Robert J. Heydel, Clawson, MI (US); Laurence J. Wilson, III, St. Clair Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 228 days.

(21) Appl. No.: 13/897,846

(22) Filed: May 20, 2013

(65) Prior Publication Data
US 2014/0338995 A1    Nov. 20, 2014

(51) Int. Cl.
*H01M 2/10*      (2006.01)
*B60R 16/04*    (2006.01)

(52) U.S. Cl.
CPC ............. *B60R 16/04* (2013.01); *H01M 2/1077* (2013.01); *Y10T 29/49826* (2015.01)

(58) Field of Classification Search
CPC    B60R 16/04; H01M 2/1061; H01M 10/0525; H01M 10/0585; H01M 2/1077; H01M 10/5055; H01M 10/5053
USPC .................. 429/153, 159, 177, 186; 180/68.5
See application file for complete search history.

(56) References Cited

U.S. PATENT DOCUMENTS

| | | |
|---|---|---|
| 2011/0139526 A1* | 6/2011 | Lucas .......................... 180/68.1 |
| 2012/0094158 A1* | 4/2012 | Wuensche ....................... 429/91 |
| 2013/0022859 A1* | 1/2013 | Lim .............................. 429/159 |

* cited by examiner

*Primary Examiner* — Muhammad Siddiquee
(74) *Attorney, Agent, or Firm* — Phillips Ryther & Winchester; John P. Davis

(57) ABSTRACT

System and methods for retaining a battery system included in a vehicle are presented. In certain embodiments, a system for enclosing a battery system may utilize a plurality of modular components. The modular components may include a plurality of first side components and a plurality of second side components coupled to the plurality of first side components. A first top component and a second top component may be coupled to the first side components. In certain embodiments, the second top component may be configured to prevent the first top component from being decoupled from the first side components.

18 Claims, 11 Drawing Sheets

BATTERY ENCLOSURE SYSTEMS AND METHODS

TECHNICAL FIELD

This disclosure relates to systems and methods for retaining a battery system. More specifically, but not exclusively, this disclosure relates to systems and methods for retaining a battery system included in a vehicle using a modular enclosure.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system (e.g., a 360V HV battery system) may be used to power electric drivetrain components of the vehicle (e.g., electric drive motors and the like). For example, an HV rechargeable energy storage system ("RESS") included in a vehicle may be used to power electric drivetrain components of the vehicle.

During operation of a vehicle, a battery system may experience a variety of forces. For example, a battery system may experience certain forces during vehicle acceleration and/or deceleration. Without adequate protection and/or retention within a vehicle, a vehicle battery system may be damaged by such forces.

SUMMARY

Systems and methods are presented herein for retaining a battery system included in a vehicle using a modular enclosure. In certain embodiments, a system for enclosing a battery system may utilize a plurality of modular components. The modular components may include a plurality of first side components and a plurality of second side components coupled to the plurality of first side components. A first top component and a second top component may be coupled to the first side components. In certain embodiments, the second top component may be configured to prevent the first top component from being decoupled from the first side components.

In further embodiments, a system may include a powertrain system configured to propel a vehicle comprising a motor configured to propel the vehicle using power provided by a battery system. The battery system may be retained in an enclosure that includes a plurality of first side components and a plurality of second side components coupled to the plurality of first side components. A first top component and a second top component may be coupled to the first side components. In certain embodiments, the second top component may be configured to prevent the first top component from being decoupled from the first side components.

In still further embodiments, a method for assembling an enclosure configured to retain a battery system may include coupling a plurality of first side components with a plurality of second side components. First and second top components may be coupled to the first side components. In certain embodiments, the second top component may be configured to prevent the first top component from being decoupled from the first side components.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein provide a modular enclosure system for a battery system included in a vehicle. In certain embodiments, the modular enclosure system may be configured to enclose a battery system and/or its consistent components. In further embodiments, the modular enclosure system may retain a battery system and/or its consistent components in a particular position within in a vehicle and/or provide mechanical structural support for a battery system.

In certain embodiments, the modular enclosure system may protect a battery system from forces, internal and external, experienced during normal vehicle operation (e.g., acceleration, deceleration, and/or vehicle impact forces). In some embodiments, the modular enclosure system may utilize one or more snap, compression, frictional fit, and/or other mechanical connections between its constituent components that allow the modular enclosure to be constructed with without discrete fasteners. In still further embodiments, the modular enclosure system disclosed herein may provide for improved volumetric efficiency over conventional battery system retention systems and methods.

Figure 1:
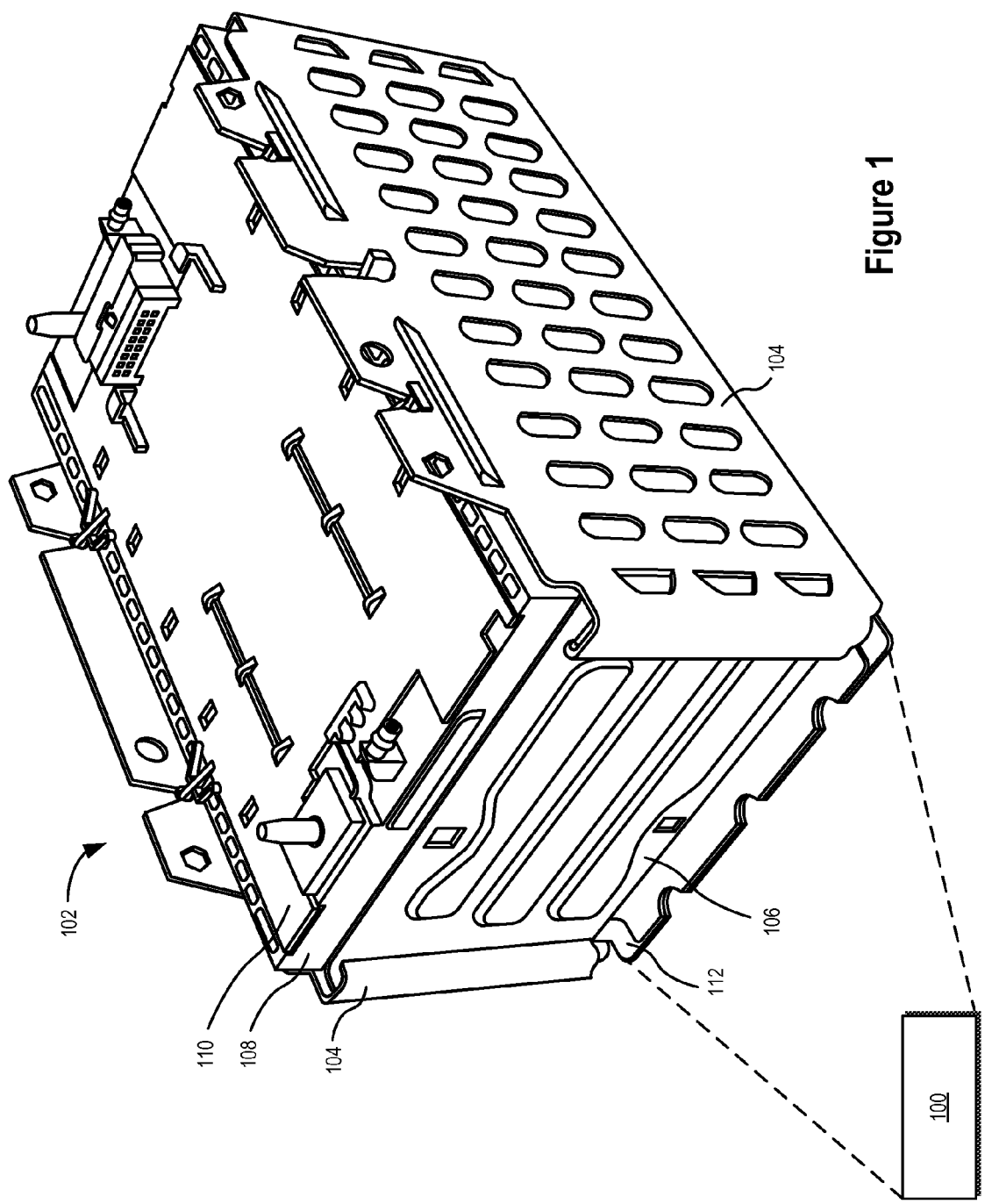
FIG. 1 illustrates a perspective view of a modular enclosure for retaining a battery system consistent with embodiments disclosed herein.

FIG. 1 illustrates a perspective view of a modular enclosure 102 for retaining a battery system 100 included in a vehicle consistent with embodiments disclosed herein. The battery system 100 may be a high voltage battery system and may utilize any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

Components of the enclosure 102 may include first side components 104, second side components 106, first top component 108, second top component 110, and/or a bottom component 112. When assembled, the components 104-112 may provide an enclosure 102 configured to retain and protect a battery system 100 included in the vehicle. For example, in certain embodiments, the illustrated enclosure 102 may retain an enclosed a battery system 100 in a particular position within a vehicle (e.g., by providing and/or facilitating mechanisms for securing the enclosure 102 and/or the battery system 100 to a portion of the vehicle) and/or provide mechanical structural support for a battery system 100 contained therein. The illustrated components 104-112 are described in more detail below in reference to FIGS. 2-10.

In some embodiments, the illustrated components 104-112 may be formed of a variety of suitable materials. For example, the components 104-112 may be formed of plastic, ceramic, metal, epoxy, polymeric material and/or any combination thereof. In certain embodiments, the components 104-112 may be comprised of a material that does not significantly degrade over time under the normal operation of the battery system 100 and/or the vehicle. The components 104-112 may further be comprised of a material that provides sufficient protection and/or structural integrity from forces occurring during the normal operation of the battery system 100 and/or the vehicle. Further, the components 104-112 may be designed to withstand forces resulting from vehicle collisions or impacts.

The illustrated components 104-112 may be constructed using a variety of suitable techniques. For example, in certain embodiments, one or more of the components 104-112 may be manufactured using an injection molding process, metal stamping, cast molding, etc. In some embodiments, the components 104-112 may have thicknesses that are substantially similar. In further embodiments, the components 104-112 may have thicknesses that are variable. For example, the components 104-112 may include thicker portions configured to provide structural support for the enclosure.

In some embodiments, the components 104-112 may include one or more interfacing rib and channel structures configured to, among other things, facilitate alignment of the components 104-112 and/or provide structural support to the assembled enclosure 102. In further embodiments, the components 104-112 may include one or more other alignment structures configured to facilitate alignment of the components 104-112 during assembly. In certain embodiments, one or more portions of components 104-112 may have varying rigidity. In some embodiments, portions of components 102-112 having less rigidity may be selectively deformed to facilitate assembly of the enclosure using, for example, one or more snap, compression, frictional fit, and/or other mechanical connections.

The illustrated components 104-112 of the enclosure 102 may further provide one or more openings configured to allow access to portions of a battery system 100 stored therein. For example, one or more openings in components 104-112 may allow access to components of a cooling system included in and/or associated with a battery system 100 (e.g., access for coolant pipes or the like). Similarly, one or more openings in components 104-112 may allow access to certain electrical components of the battery system 100 (e.g., electrical contacts or the like). In certain embodiments, the openings may perform one or more passive functions such as, for example, temperature regulation of a battery system 100 by providing airflow through the enclosure 102. In still further embodiments, the illustrated components 104-112 may include structures configured to interface with certain systems of the battery system 100 (e.g., cooling systems and/or electrical systems). For example, in some embodiments, the illustrated components 104-112 may include valves and/or ports configured to interface with a cooling system of an enclosed battery system 100.

Figure 2:
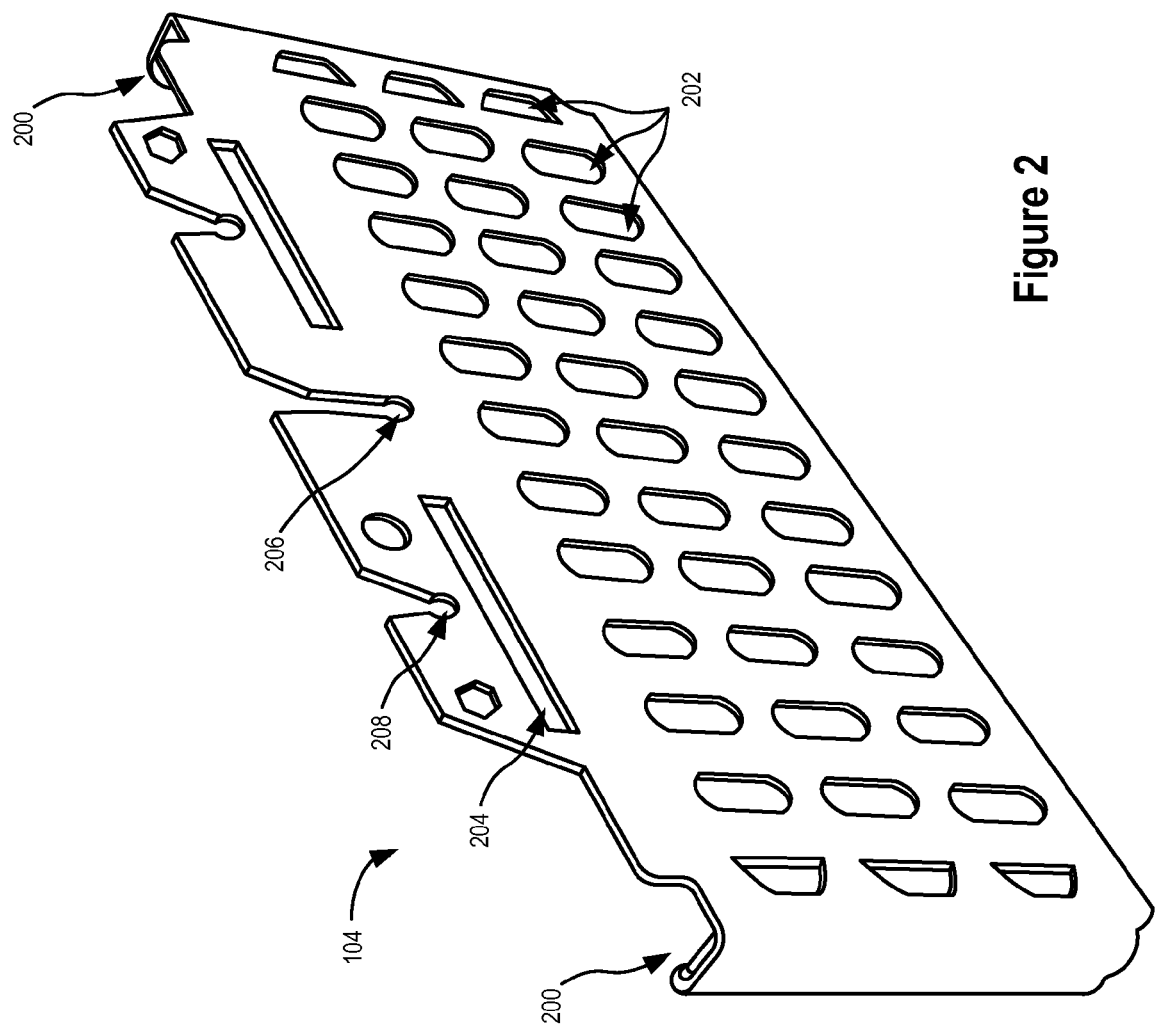
FIG. 2 illustrates a perspective view of a first side component of a modular enclosure for retaining a battery system consistent with embodiments disclosed herein.

FIG. 2 illustrates perspective view of a first side component 104 of a modular enclosure for retaining a battery system consistent with embodiments disclosed herein. The first side component 104 may include one or more openings 202. The one or more openings 202 may provide a variety of functions. For example, in certain embodiments, the one or more openings 202 may provide for cooling and/or temperature regulation of a battery system from air circulation through the openings 202. The one or more openings 202 may further facilitate assembly of the modular enclosure by providing one or more positions in which the first side component 104 may be manipulated.

In some embodiments, the first side component 104 may include one or more or more side securement structures 200 configured to interface with a complementary securement structure associated with a second side component of the enclosure. As illustrated, in certain embodiments the side securement structures 200 may be disposed on opposite edges of the first side component 104. In some embodiments, the side securement structures 200 may be configured to form a portion of a snap, compression, frictional fit, and/or other mechanical connection when interfaced with a complementary securement structure associated with the second side component. In further embodiments, the side securement structures 200 may define a channel in which a complementary structure associated with a second side component may fit within the form a mechanical connection.

The first side component 104 may further included one or more first top component interface openings 204 configured to interface with a complementary securement structure associated with a first top component of the enclosure. In some embodiments, the first top component interface opening 204 may be configured to form a portion of a snap, compression, frictional fit, and/or other mechanical connection when interfaced with a commentary securement structure associated with the first top component. In some embodiments, the portions of the first side component 104 associated with the first top component interface openings 204 may be less rigid than other portions of the first side component 104, thereby allowing the portions associated with the openings to be selectively deformed (e.g., bent and/or deflected outwards) to facilitate securement of the first side component 104 with the first top component during assembly.

In certain embodiments, the first side component 104 may include one or more alignment channels 206 configured to facilitate alignment of the first side component with a first top component, a second top component, and/or any other component associated with the enclosure. In further embodiments, the alignment channels 206 may be configured to interface with one or more structures associated with the first top component, a second top component, and/or any other component associated with the enclosure to provide a mechanical connection.

In further embodiments, the first side component 104 may include one or more second top component securement channels 208 configured to interface with a complementary securement structure associated with a second top component of the enclosure. For example, in some embodiments, the second top component securement channels 208 may be configured to form a portion of a snap, compression, frictional fit, and/or other mechanical connection when interfaced with a commentary securement member associated with the second top component.

Figure 3:
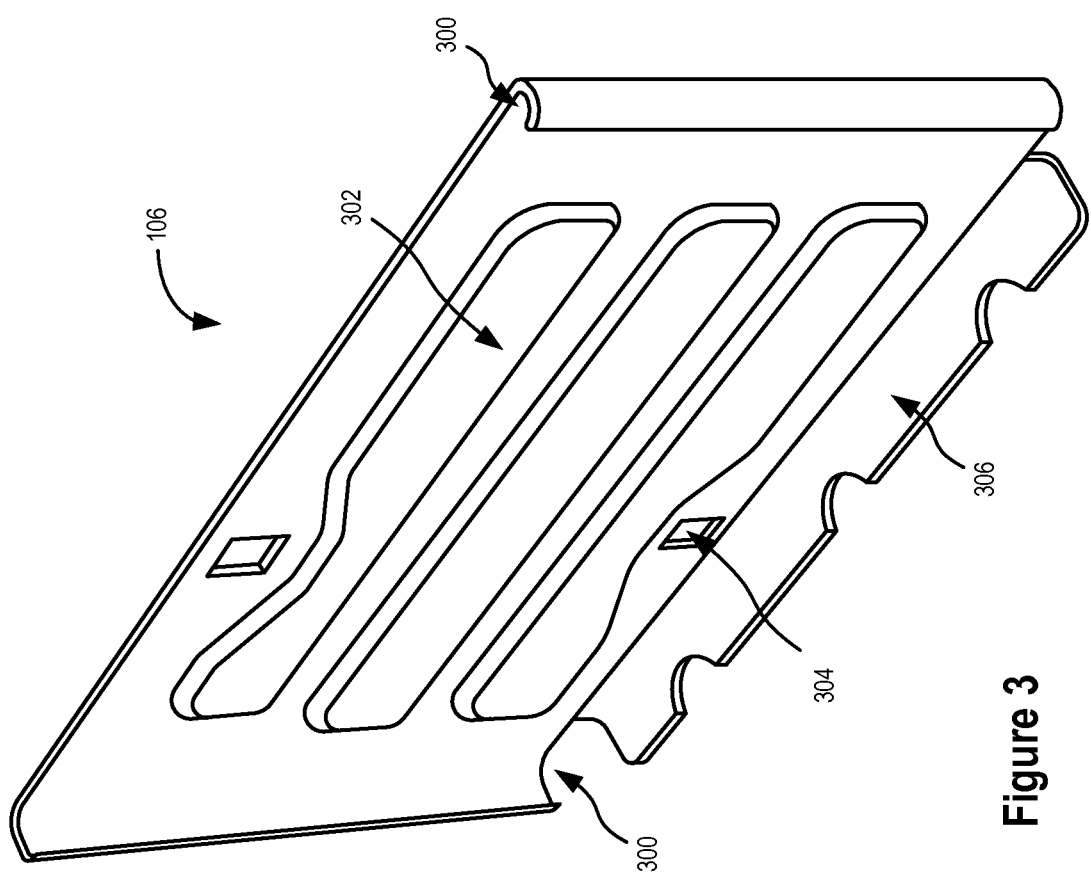
FIG. 3 illustrates a perspective view of a second side component of a modular enclosure for retaining a battery system consistent with embodiments disclosed herein.

FIG. 3 illustrates a second side component 106 of a modular enclosure for retaining a battery system consistent with embodiments disclosed herein. In some embodiments, the second side component 106 may include one or more or more side securement structures 300 configured to interface with a complementary securement structure associated with a first side component of the enclosure. As illustrated, in certain embodiments, the side securement structures 300 may be disposed on opposite edges of the second side component 106. In some embodiments, the side securement structures 300 may be configured to form a portion of a snap, compression, frictional fit, and/or other mechanical connection when interfaced with a complementary securement structure associated with the second side component. In further embodiments, the side securement structures 300 may be secured within a complementary channel structure associated with a first side component to form a mechanical connection between the first side component and the second side component 106.

The second side component 106 may include one or more openings 304. The one or more openings 304 may provide a variety of functions. For example, in certain embodiments, the one or more openings 304 may provide for cooling and/or temperature regulation of a battery system, may facilitate access to certain battery system components (e.g., cooling system components), and/or may facilitate alignment of the second side component 106 during assembly of an associated enclosure.

In certain embodiments, the second side component 106 may include one or more ridges and/or raised portions 302. Among other functions, the ridges and/or raised portions 302 may provide increased structural rigidity of the second side component 106 and/or facilitate alignment of the second side component 106 during assembly. In further embodiments, the second side component 106 may include one or more bottom securement structures 306 configured to interface with an enclosure bottom component by aligning the second side component 106 in a particular position relative to an enclosure bottom component.

Figure 4:
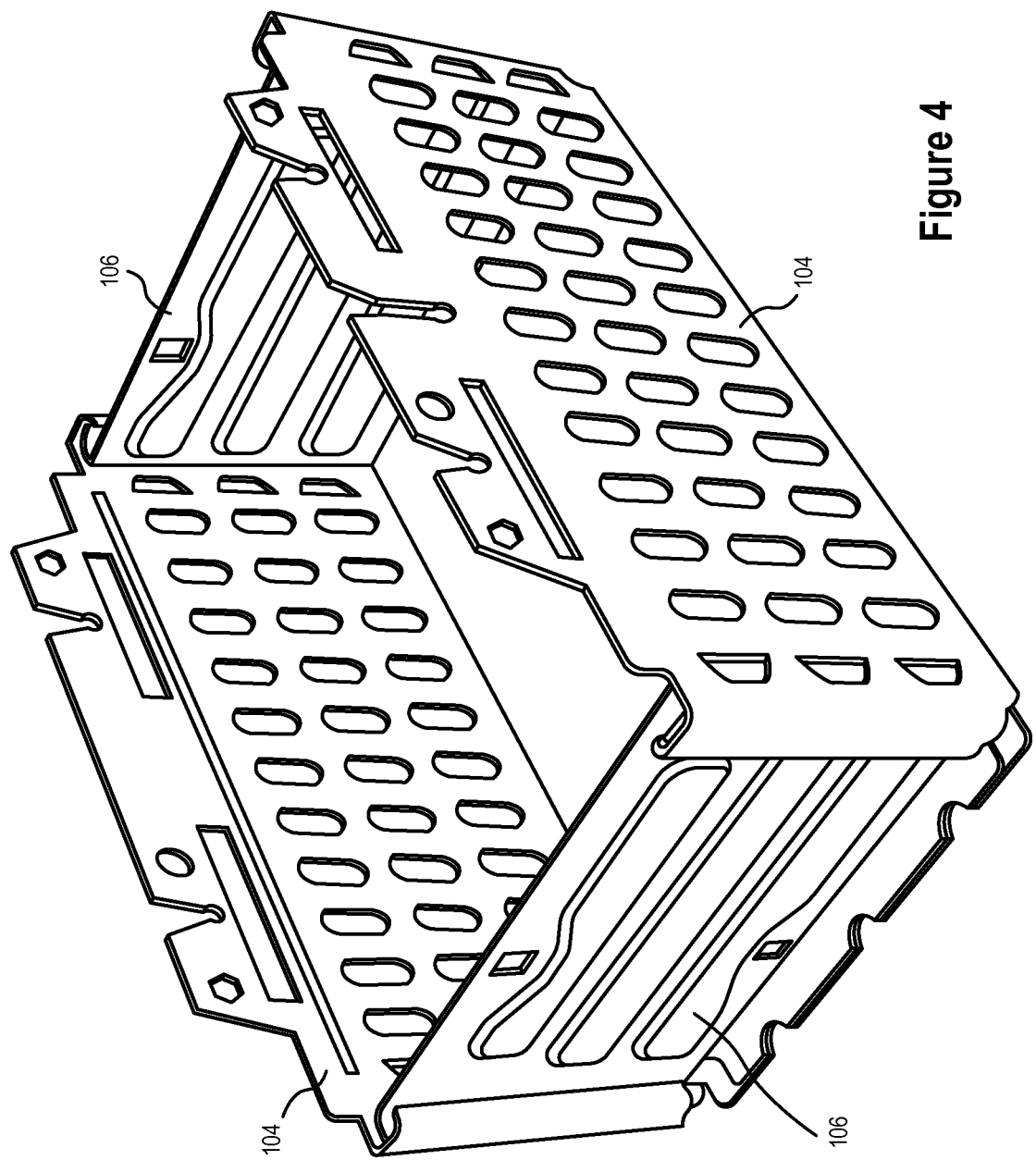
FIG. 4 illustrates a perspective view of assembled sides of a modular enclosure for retaining a battery system consistent with embodiments disclosed herein.

FIG. 4 illustrates a perspective view of assembled sides 104, 106 of a modular enclosure for retaining a battery system consistent with embodiments disclosed herein. As illustrated, first side components 104 may be secured with second side components 106 and/or a bottom component (not shown) to form an open box structure.

Figure 5:
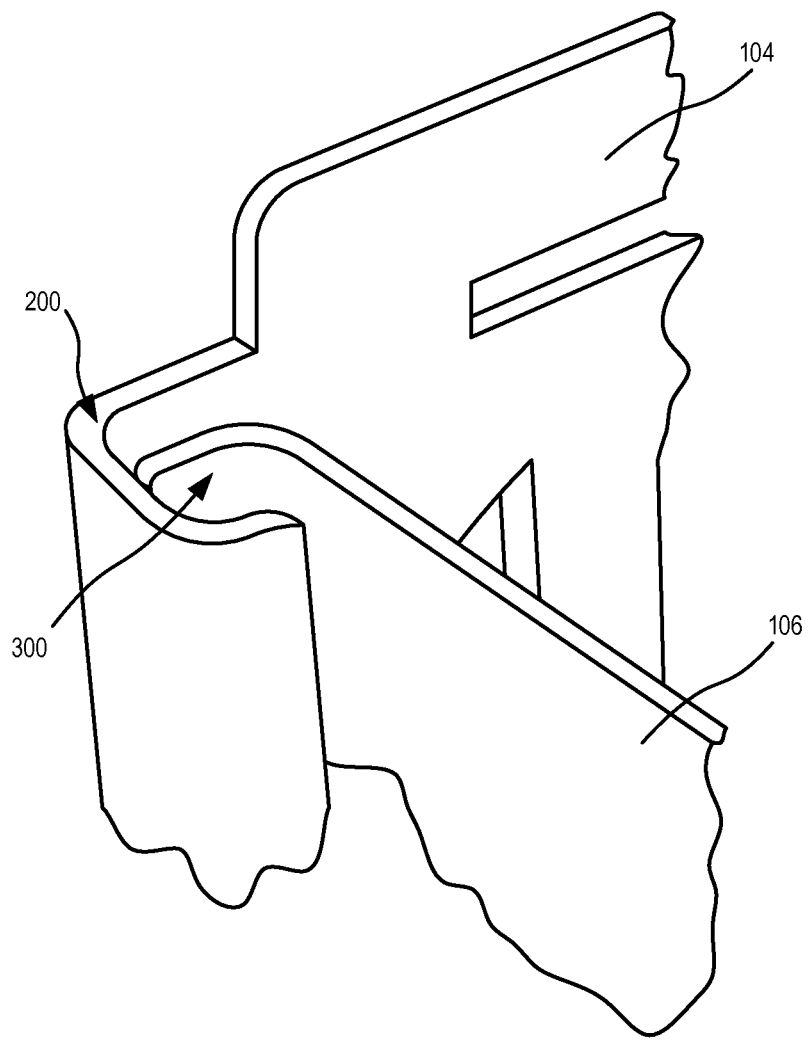
FIG. 5 illustrates a perspective view of an interface between assembled sides of a modular enclosure for retaining a battery system consistent with embodiments disclosed herein.

FIG. 5 illustrates a perspective view of an interface between assembled sides 104, 106 of a modular enclosure for retaining a battery system consistent with embodiments disclosed herein. As discussed above, in certain embodiments, a side securement structure 200 of a first side component 104 may define a channel. A complementary side securement structure 300 of a second side component 106 may be configured to fit within the channel defined by the side securement structure 200 of the first side component 104 to form a mechanical connection between the first and second side components 104, 106. In further embodiments, securement structures 200, 300 may collectively form a snap, compression, frictional fit, and/or other mechanical connection when interfaced to secure the first and second side components 104, 106.

Figure 6:
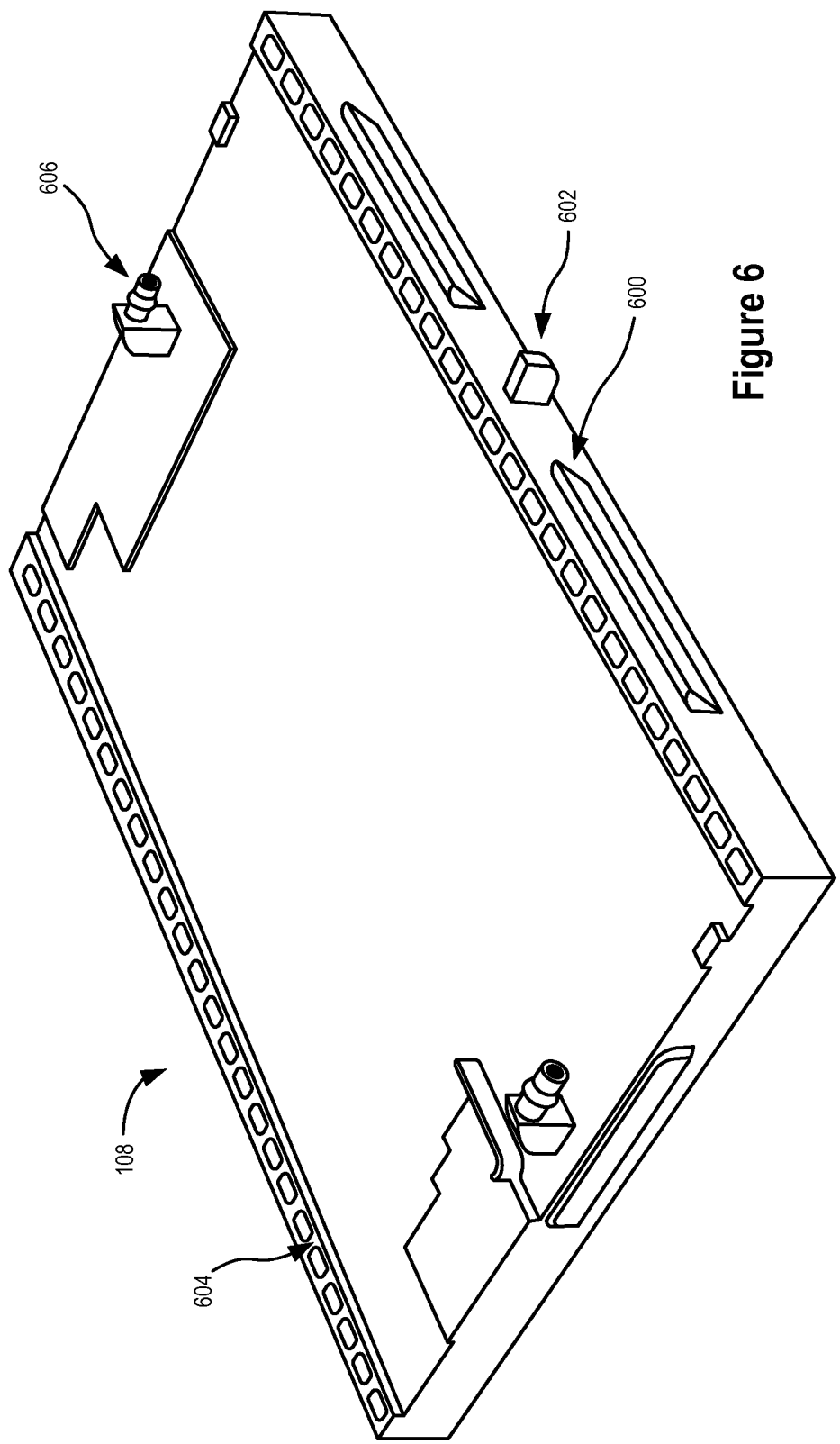
FIG. 6 illustrates a first top component of a modular enclosure for retaining a battery system consistent with embodiments disclosed herein.

FIG. 6 illustrates a first top component 108 of a modular enclosure for retaining a battery system consistent with embodiments disclosed herein. The first top component 108 may include one or more or more side securement members 600. The side securement members 600 may be configured to interface with a complementary securement opening associated with a first and/or a second side component of the enclosure. Although not illustrated in the perspective view of FIG. 6, in certain embodiments, one or more side securement members 600 may be disposed on opposing sides of the first top component 108. In some embodiments, the side securement members 600 may be configured to form a portion of a snap, compression, frictional fit, and/or other mechanical connection when interfaced with a complementary securement opening associated with a first side component. For example, in some embodiments, the side securement member 600 may define a raised lip structure configured to form a snap fit connection when interfaced with a complementary securement opening associated with a first side component.

In certain embodiments, the first top component 108 may include one or more alignment structures 602 used in aligning the first top component 108 relative to other components (e.g., first and/or second side components) during assembly of the enclosure. For example, in some embodiments, alignment structure 602 may be configured to interface with an alignment channel included in a first and/or second side component to facilitate alignment of the first top component 108 relative to the first and/or second side components during assembly of the enclosure.

In further embodiments, the first top component 108 may include one or more ridges and/or raised portions 604. Among other functions, the ridges and/or raised portions 604 may provide increased structural rigidity of the first top component 108 and/or facilitate alignment of the first top component 108 during assembly. In still further embodiments, the first top component 108 may include one or more structures 606 configured to interface with certain systems of the battery system (e.g., cooling systems and/or electrical systems). For example, the first top component 108 may include one or more valves and or ports 606 configured to interface with a cooling system of an enclosed battery system.

Figure 7:
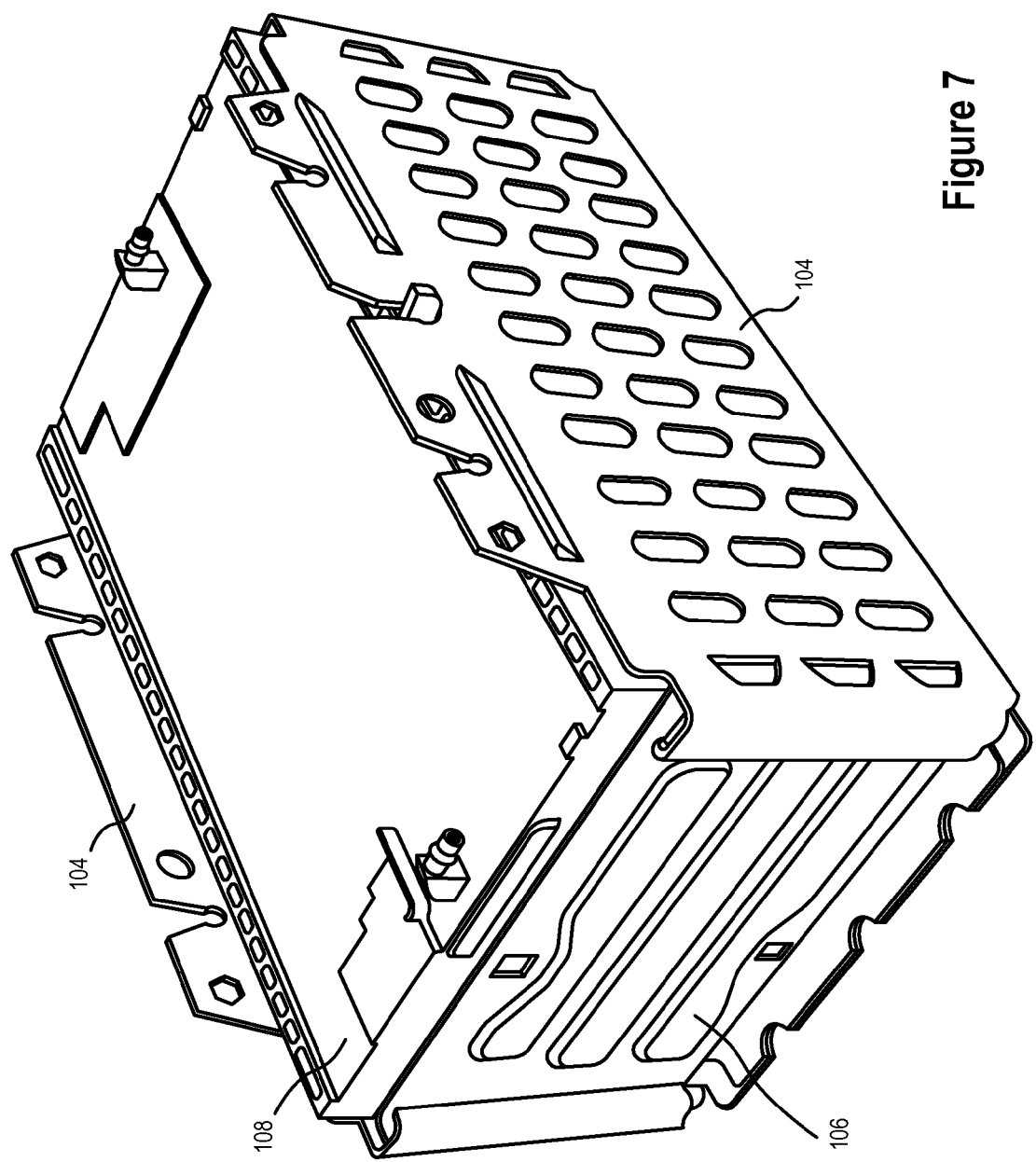
FIG. 7 illustrates a perspective view of assembled sides and a first top component of a modular enclosure for retaining a battery system consistent with embodiments disclosed herein.

FIG. 7 illustrates a perspective view of assembled sides 104, 106 and a first top component 108 of a modular enclosure for retaining a battery system consistent with embodiments disclosed herein. As illustrated, first side components 104, second side components 106, first top component 108, and/or a bottom component (not shown) may be secured together to form an enclosure for a battery system.

Figure 8:
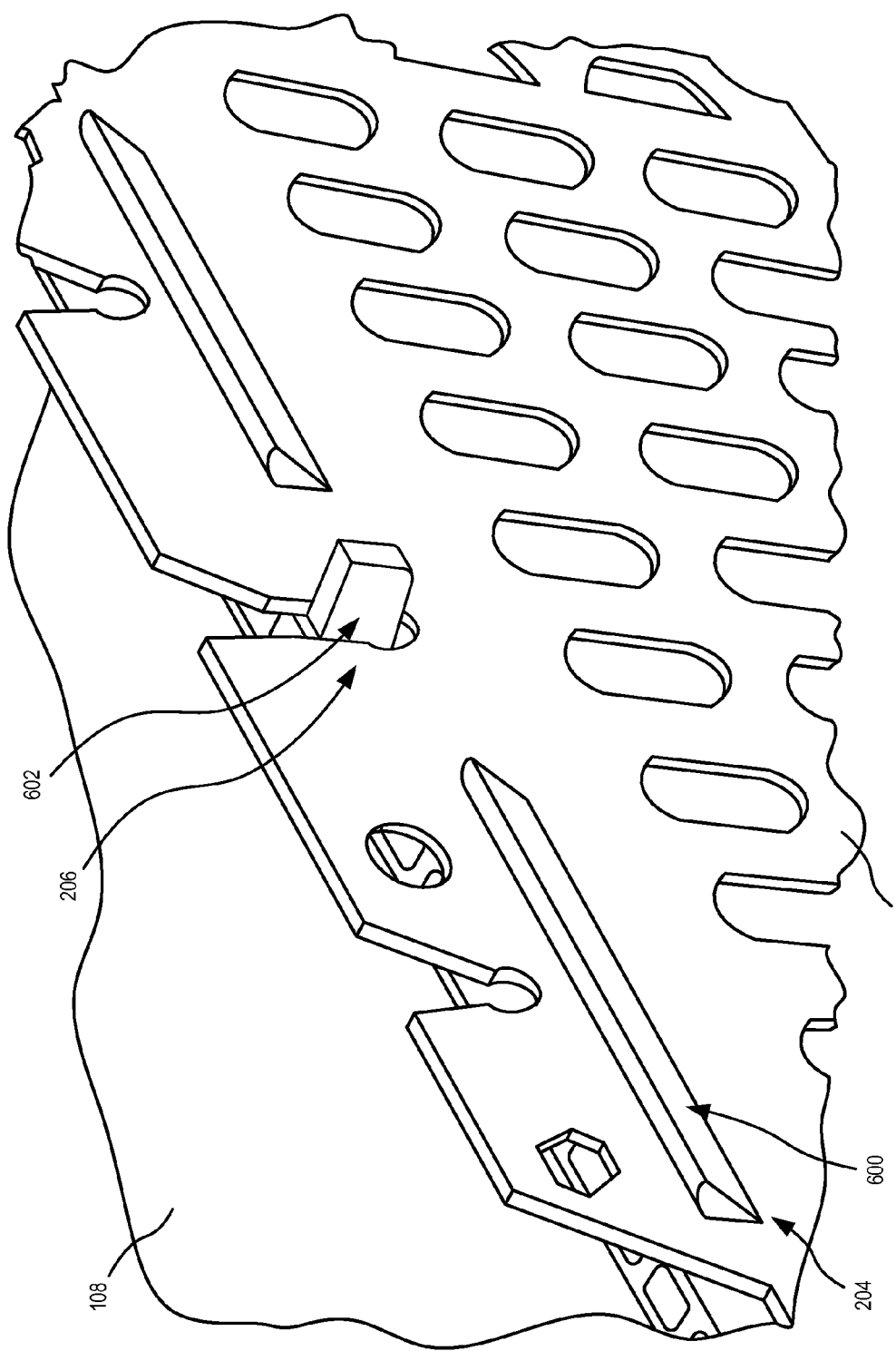
FIG. 8 illustrates a perspective view of an interface between a side and a first top component of a modular enclosure for retaining a battery system consistent with embodiments disclosed herein.

FIG. 8 illustrates a perspective view of an interface between a first side component 104 and a first top component 108 of a modular enclosure for retaining a battery system consistent with embodiments disclosed herein. As discussed above, in certain embodiments the first side component 104 may include one or more first top component interface openings 204. The openings 204 may be configured to interface with a complementary first top component securement member 600. In certain embodiments, the first top component interface opening 204 and the first top component securement member 600 may be configured to form a snap, compression, frictional fit, and/or other mechanical connection when assembled. For example, in the illustrated embodiments, the first top component securement member 600 may comprise a raised lip structure configured to form a snap fit connection when interfaced with the first top component interface opening 204.

In some embodiments, the portions of the first side component 104 associated with the first top component interface openings 204 may be less rigid than other portions of the first side component 104, thereby allowing the portions associated with the first top component interface openings 204 to be selectively deformed (e.g., bent and/or deflected outwards) to facilitate securement of the first top component securement member 600 with the first top component interface opening 204 during assembly. In certain embodiments, the first top component securement member 600 may be designed to facilitate deformation of portions of the first side component 104 when pressed down relative to the first side component 104 to interface with the first top component interface opening 204 during assembly.

In further embodiments, the first side component 104 may include one or more alignment channels 206 configured to facilitating alignment of the first side component 104 relative to the first top component 108 during assembly of the enclosure. For example, in some embodiments, an alignment structure 602 included on the first top component 108 may be configured to interface with an alignment channel 206 included in the first side component 104 to facilitate alignment of the first top component 108 relative to the first side component 104.

Figure 9:
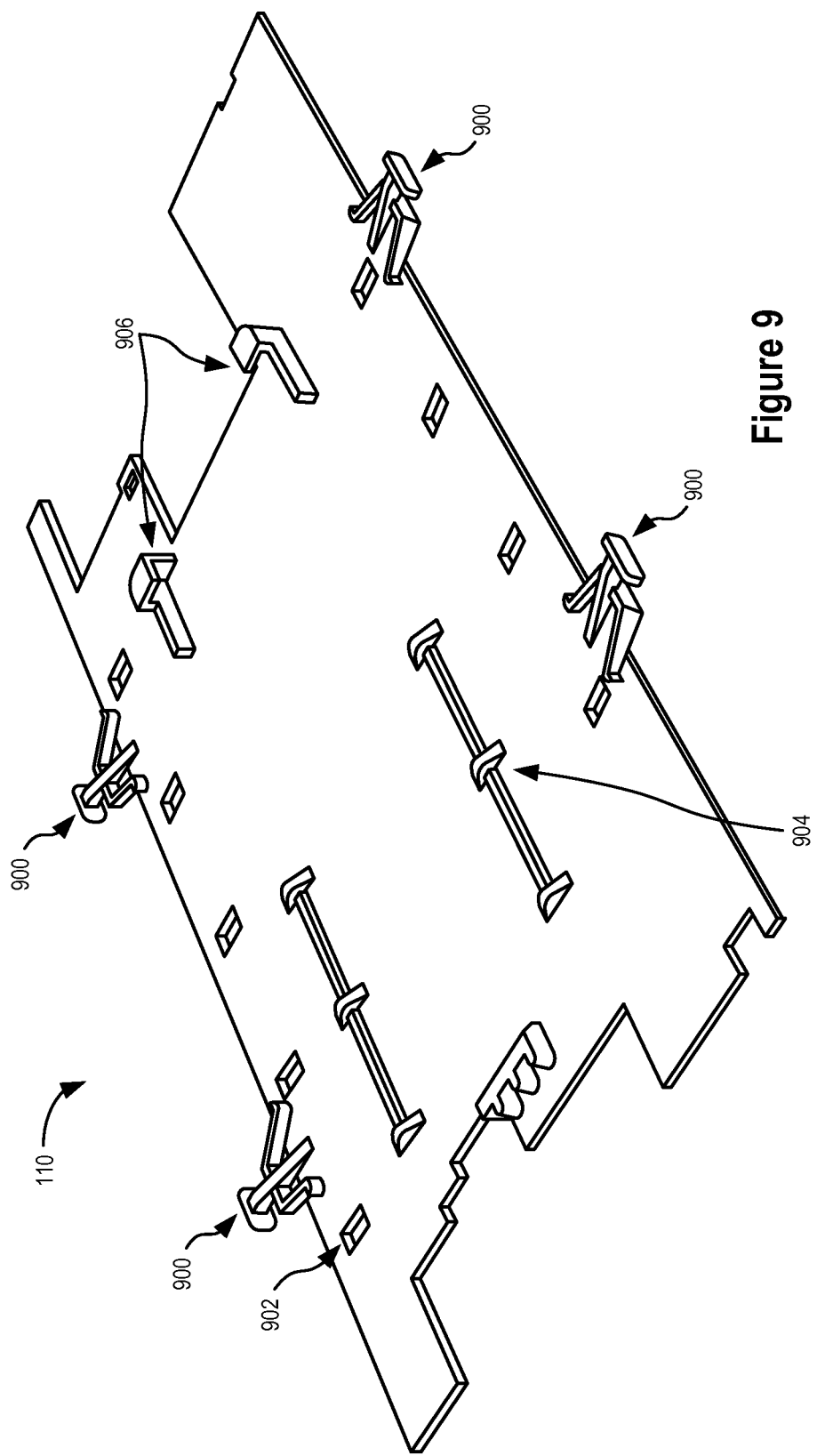
FIG. 9 illustrates a second top component of a modular enclosure for retaining a battery system consistent with embodiments disclosed herein.

FIG. 9 illustrates a second top component 110 of a modular enclosure 102 for retaining a battery system consistent with embodiments disclosed herein. In certain embodiments, the second top component 110 may be placed on top of a first top component during assembly of the enclosure, and may provide additional structural support to the enclosure. The second top component 110 may include one or more or more second top component securement members 900. The second top component securement members 900 may be configured to interface with a complementary securement opening associated with a first and/or a second side component of the enclosure. In certain embodiments, one or more second top component securement members 900 may be disposed on opposing sides of the second top component 110. In some embodiments, the second top component securement members 900 may be configured to form a portion of a snap, compression, frictional fit, and/or other mechanical connection when interfaced with a complementary securement opening associated with a first side component. For example, in the illustrated embodiments, the second top component securement member 900 may comprise a T-shaped structure configured to form a snap fit connection when interfaced with a complementary securement opening associated with a first side component.

The second top component 110 may include one or more openings 902. The one or more openings 902 may provide a variety of functions. For example, in certain embodiments, the one or more openings 902 may provide for cooling and/or temperature regulation of a battery system retained in the enclosure, may facilitate access to certain battery system components (e.g., cooling system components), and/or may facilitate alignment of the second top component 110 during assembly of an enclosure.

In further embodiments, the second top component 110 may include one or more ridges and/or raised portions 904. Among other functions, the ridges and/or raised portions 904 may provide increased structural rigidity of the second top component 110 and/or facilitate alignment of the second top component 110 during assembly. In still further embodiments, the first top component 110 may include one or more structures 906 configured to interface with certain systems of the battery system (e.g., cooling systems and/or electrical systems). For example, the second top component 110 may include one or more structures 906 configured to secure an electrical wiring harness associated with an enclosed battery system.

Figure 10:
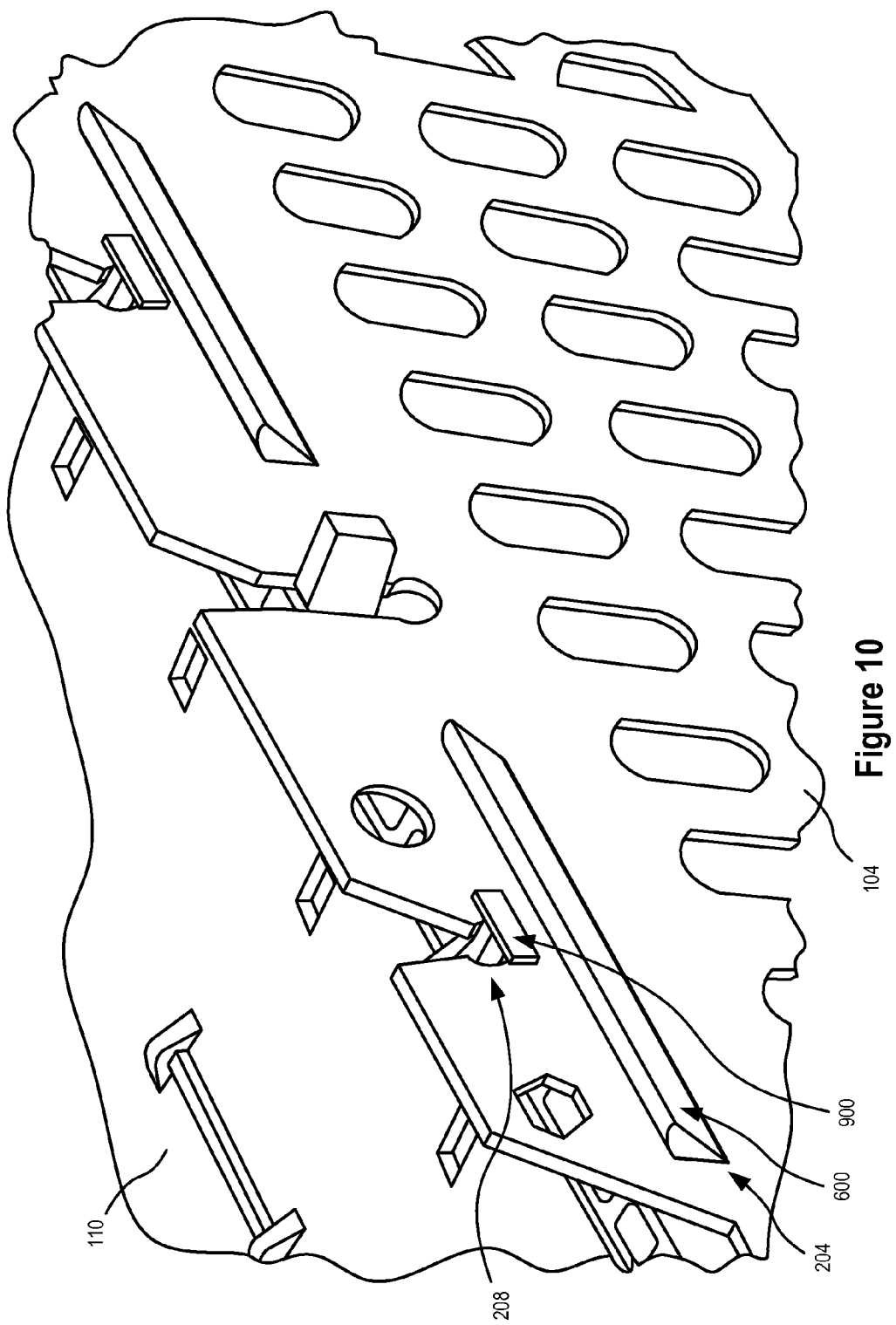
FIG. 10 illustrates a perspective view of an interface between a side and a second top component of a modular enclosure for retaining a battery system consistent with embodiments disclosed herein.

FIG. 10 illustrates a perspective view of an interface between a first side component 104 and a second top component 110 of a modular enclosure for retaining a battery system consistent with embodiments disclosed herein. As discussed above, in certain embodiments the first side component 104 may include one or more second top component interface openings 208. The openings 208 may be configured to interface with a complementary second top component securement member 900 associated with the second top component 110. In certain embodiments, the second top component interface opening 208 and the second top component securement member 900 may be configured to form a snap, compression, frictional fit, and/or other mechanical connection when assembled. For example, as illustrated, a second top component securement member 900 may define a T-shaped structure 900 configured to form a snap fit connection when interfaced with the second top component interface opening 208.

In some embodiments, the portions of the first side component 104 associated with the first top component interface openings 204 may be less rigid than other portions of the first side component 104, thereby allowing the portions associated with the openings to be selectively deformed (e.g., bent and/or deflected outwards) to facilitate securement of first top component side securement member 600 with the first top component interfacing opening 204 during assembly. When secured in the second top component interface opening 208, the T-shaped structure of second top component securement member 900 of the second top component 110 may prevent the first side component 104 from being bent and/or deflected outwards. That is, when secured, the second top component 110 may prevent the first top component from being decoupled from the first side component 104. Accordingly, the second top component 110 may help to ensure that the first top component remains secured to the first side component 104.

Figure 11:
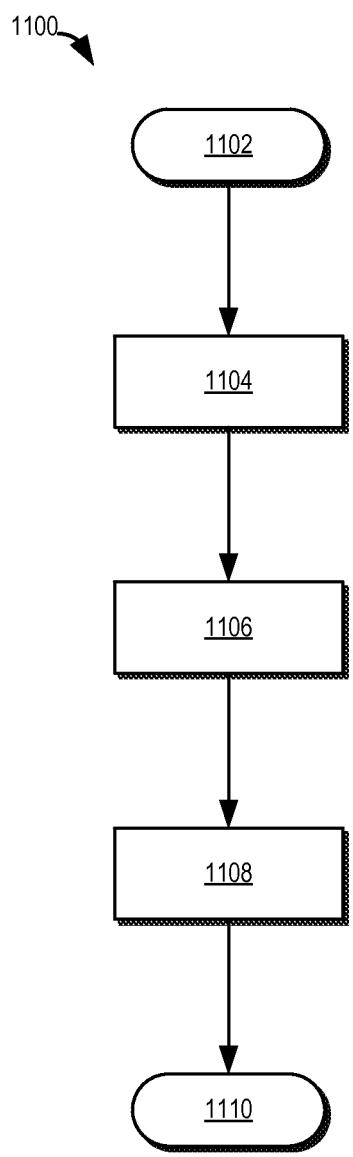
FIG. 11 illustrates a flow chart of an exemplary method of assembling a modular enclosure for retaining a battery system consistent with embodiments disclosed herein.

FIG. 11 illustrates a flow chart of an exemplary method 1100 of assembling a modular enclosure for retaining a battery system consistent with embodiments disclosed herein. At 1102, the method 1100 may be initiated. At 1104, a plurality of first side components may be coupled with a plurality of second side components. For example, two first side components may be coupled with two second side components to form an open top box structure. As discussed above, in certain embodiments, such coupling may utilize one or more snap, rib and channel, compression, frictional fit, and/or other suitable mechanical connections.

At 1106, a first top component may be coupled to the first side components. In certain embodiments, the first top component may be coupled to the first side components using one or more snap, rib and channel, compression, frictional fit, and/or other suitable mechanical connections. In some embodiments, the first top component may include a raised lip structure configured to interface with an opening of the first side component to form a mechanical connection. At 1108, the second top component may be coupled to the first side component using one or more snap, rib and channel, compression, frictional fit, and/or other suitable mechanical connections. For example, in some embodiments, the second top component may include a T-shaped structure configured to interface with a channel of the first side component to form a mechanical connection. In certain embodiments, when coupled to the first side component, the second top component may be configured to prevent the first top component from being decoupled from the first side component. At 1110, the method may terminate.

Although the foregoing has been described in some detail for purposes of clarity, it will be apparent that certain changes and modifications may be made without departing from the principles thereof. For example, in certain embodiments, the systems and methods disclosed herein may be utilized in connection with battery systems not included in a vehicle. Further, the systems and methods disclosed herein may be utilized to provide enclosure for a variety of other systems including, for example, fuel cell systems. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection. Those having skill in the art will appreciate that many changes may be made to the details of the above-described embodiments without departing from the underlying principles of the invention. The scope of the present invention should, therefore, be determined only by the following claims.

The invention claimed is:

1. A enclosure system for retaining a battery system using a plurality of modular components, comprising:
a plurality of first side components;
a plurality of second side components, each second side component being coupled to the plurality of first side components;
a first top component coupled to the first side components; and
a second top component coupled to the first side components;
wherein the second top component comprises at least one second top component securement member and each first side component comprises at least one second top component securement opening configured to receiving a second top component securement member and thereby form a mechanical connection between the second top component and the first side components preventing the first top component from being decoupled from the first side components by preventing outward deformation of the first side components.

2. The enclosure system of claim 1, wherein the first side components and the second side components each comprise one or more openings.

3. The enclosure system of claim 1, wherein the plurality of modular components are configured to be assembled using only integrally formed securement systems.

4. The enclosure system of claim 1, wherein each second side component is configured to be coupled to the plurality of first side components using a connection comprising at least one of a snap mechanical connection, a compression mechanical connection, and a frictional fit mechanical connection.

5. The enclosure system of claim 1, wherein each second side component comprises at least one rib structure and each first side component comprises at least one channel structure configured to receive a rib structure of a second side component thereby coupling a first side component to a second side component.

6. The enclosure system of claim 1, wherein the first top component comprises a first top component securement member and each first side component comprises at least one first top component interface opening configured to receive the first top component securement member and thereby form a mechanical connection between the first top component and the first side component.

7. The enclosure system of claim 6, wherein the first top component securement member comprises a raised lip structure configured to be secured within the first top component interface opening by selectively deforming a portion of the first side component.

8. The enclosure system of claim 1, wherein the second top component securement opening comprises a channel and the second top component securement member comprises a T-shaped structure configured to be secured within the channel.

9. The enclosure system of claim 8, wherein the second top component is configured to prevent the first top component from being decoupled from the first side component when the T-shaped structure is secured within the channel by preventing outward deformation of the first side components.

10. A system comprising:
a powertrain system configured to propel a vehicle, the powertrain system comprising:
 a motor configured to propel the vehicle;
 a battery system in electrical communication with the motor; and
 a enclosure configured to retain the battery system comprising:
  a plurality of first side components;
  a plurality of second side components, each second side component being coupled to the plurality of first side components;
  a first top component coupled to the first side components; and
  a second top component coupled to the first side components;
  wherein the second top component comprises at least one second top component securement member and each first side component comprises at least one second top component securement opening configured to receiving a second top component securement member and thereby form a mechanical connection between the second top component and the first side component preventing the first top component from being decoupled from the first side components by preventing outward deformation of the first side components.

11. The system of claim 10, wherein the first side components and the second side components each comprise one or more openings.

12. The system of claim 10, wherein each second side component is configured to be coupled to the plurality of first side components using a connection comprising at least one of a snap mechanical connection, a compression mechanical connection, and a frictional fit mechanical connection.

13. The system of claim 10, wherein each second side component comprises at least one rib structure and each first side component comprises at least one channel structure configured to receive a rib structure of a second side component thereby coupling a first side component to a second side component.

14. The system of claim 10, wherein the first top component comprises a first top component securement member and each first side component comprises at least one first top component interface opening configured to receive the first top component securement member and thereby form a mechanical connection between the first top component and the first side component.

15. The system of claim 14, wherein the first top component securement member comprises a raised lip structure configured to be secured within the first top component interface opening by selectively deforming a portion of the first side component.

16. The enclosure system of claim 10, wherein the second top component securement opening comprises a channel and the second top component securement member comprises a T-shaped structure configured to be secured within the channel.

17. The enclosure system of claim 16, wherein the second top component is configured to prevent the first top component from being decoupled from the first side component when the T-shaped structure is secured within the channel by preventing outward deformation of the first side components.

18. A method for assembling an enclosure configured to retain a battery system comprises:
coupling a plurality of first side components with a plurality of second side components;
coupling a first top component to the first side components; and
coupling a second top component to the first side components,
wherein the second top component comprises at least one second top component securement member and each first side component comprises at least one second top component securement opening configured to receive a second top component securement member and thereby form a mechanical connection between the second top component and the first side component preventing the first top component from being decoupled from the first side component by preventing outward deformation of the first side component.

* * * * *